United States Patent [19]

Paolini

[11] 4,060,190

[45] Nov. 29, 1977

[54] PROCESS FOR JOINING TUBULAR MEMBERS OF GREAT LENGTH

[75] Inventor: Laurent Paolini, Nice, France

[73] Assignee: Naphtachimie, Paris, France

[21] Appl. No.: 444,515

[22] Filed: Feb. 21, 1974

[30] Foreign Application Priority Data

Feb. 21, 1973    France ................................ 73.06063

[51] Int. Cl.² ............................................. B23K 19/02
[52] U.S. Cl. ....................................... 228/2; 228/6 R;
228/9; 228/44.1 R; 228/102; 228/112
[58] Field of Search ........................ 228/2, 4, 6, 44, 49,
228/4.1, 44.1, 112, 113, 9, 102; 29/470.3, 472.1,
470.7; 156/73, 560

[56] References Cited

U.S. PATENT DOCUMENTS

| | | | |
|---|---|---|---|
| 3,314,583 | 4/1967 | Roberts | 228/2 |
| 3,745,641 | 7/1973 | Paolini | 228/2X |
| 3,800,995 | 4/1974 | Franks et al. | 228/2 |
| 3,820,231 | 6/1974 | Sage | 228/2 X |

FOREIGN PATENT DOCUMENTS 2,127,663  6/1971  Germany ................................ 228/2

Primary Examiner—Francis S. Husar
Assistant Examiner—Gus T. Hampilos
Attorney, Agent, or Firm—McDougall, Hersh & Scott

[57] ABSTRACT

Process and apparatus for assembling tubular components of metal or thermoplastic material by frictional welding in which use is made of a short tubular connecting cuff placed between the end surfaces to be assembled of the two tubular members held in alignment with said cuff and which is rotated about an axis perpendicular to the surfaces to be welded while regulating the position of the cuff along the axis until uniform softening by friction is obtained of the contacting surfaces, the rotation of the cuff is then stopped while maintaining a pressure on the tubes until the weld is consolidated upon cooling.

The apparatus is characterized by the fact that thrusts independent of one another are exerted between the cuffs and tubes so as to produce pressure contact between the two ends of the cuffs and corresponding ends of the tubes.

5 Claims, 21 Drawing Figures

PROCESS FOR JOINING TUBULAR MEMBERS OF GREAT LENGTH

This application relates to the apparatus and process which enables tubular members of great length, made of metal or thermoplastic material to be joined by welding. Reference is made to my U.S. Pat. No. 3,745,641 issued July 17, 1973 and entitled METHOD AND APPARATUS FOR JOINING TWO ELEMENTS MADE OF METAL OR THERMOPLASTIC MATERIAL.

This process consists of assembling two tubes by keeping them stationary one to another, their end surfaces to be assembled facing one another in parallel planes; placing between the surfaces a short tubular connecting piece called a cuff, so that the surfaces to be assembled are each in contact with the cuff; putting the cuff into rotation around an axis perpendicular to the planes of the surfaces to be welded, all this under mechanical pressure but regulating the position of the cuff along this axis until equal softening by friction is obtained of the surfaces in contact; stopping the rotation of the cuff and maintaining a pre-adjusted pressure on the tubular components until the welding is consolidated by cooling.

It should be noted that the surfaces of the tubes and cuff to be welded do not appear in planes that are absolutely parallel, this being due mainly to the differences in positioning and clamping of the parts, cuts that are more or less skew, etc. If a single thrust is exerted on all the tubular components and sleeves connecting them, i.e., affecting all the surfaces at once, one of the welds may commence to flow before the other, which makes execution of the latter at least difficult.

To get the most favorable conditions for obtaining a good weld, it is thus necessary to be able to displace the cuff perpendicular to the plane of the surfaces being welded, this displacement being realized by a system exerting independent thrusts, possibly different from one another.

One of the objects of the invention is to ensure displacement of the cuffs perpendicular to the planes of the surfaces being welded independently in relation to the said surfaces.

According to one characteristic of the invention, thrusts independent of one another are exerted between the sleeve and tubes to be welded to it, so as to produce separately the contact under pressure between the two ends of the cuff and the corresponding ends of the two tubes. When the two welds have reached the same state, the jacks can be brought into play so that the thrusts become equal on either side of the weld, which enables two welds to be made in a common way.

A device according to the invention consists essentially of two distinct jacks or groups of jacks acting respectively and independently between each of the tubes and the cuff. According to another form of embodiment, an apparatus containing such a device comprises a frame arranged parallel to the axis of the cuff, which frame remains stationary during the welding; a central chuck gripping the cuff by means of fixing devices, this chuck capable of rotating with regard to the frame causing the cuff to rotate; an end chuck gripping one of the tubes and mounted so as to be able to slide on the frame so as to move along the axis of the cuff under the action of one or more axial-thrust jacks integral with the frame, and another end chuck gripping the other tube, this second chuck also being able to move along the axis of the cuff under the action of one or more axial-thrust jacks integral with the frame.

The frame which carries the apparatus can with advantage consist of a number of parallel tie-bars on which the end chucks slide.

The axial-thrust jacks which carry out displacement of the end chucks are integral with the chucks on one side and with the frame on the other.

The fixed parts on which the central chuck bears during its rotation are also integral with the frame.

According to another characteristic of the invention, the central chuck comprises a tube formed by two separable parts, each of these parts having a device for tightening on the cuff. The tube forming the central chuck has a diameter appreciably larger than that of the cuff, with a view to the possibility for closed machines of taking curved tubes.

Between the two tubular components of the chuck is mounted the device for driving it in rotation; this device can consist of a toothed wheel or a pulley driven from a motor by means of a transmission such as a gear train, chain or belt. The axial thrusts to which the central chuck is subjected can be absorbed by means of thrust bearings, these bearings being of ball or roller type, able to be mounted on parts integral with the frame. According to one variant the bearings of the chuck can also constitute the thrust bearings.

The gripping parts of the central chuck can consist of jacks connected with centering devices. They can also consist of devices for driving by friction, such as cams fitted with jaws, these devices being self-centering and also self-gripping.

The end chucks are fitted with fixing components to ensure that the chucks are held in a fixed position with regard to the tube to be assembled, while enabling the latter to be displaced axially under the action of the axial-thrust jacks. These fixing components may, like those of the central chuck, consist of jacks, friction devices such as cams with self-tightening and self-centering jaws. They are mounted on the frame so as to be able to slide along it.

According to another characteristic of the invention, the apparatus comprises plates integral with the frame and plates integral with the fixing components of the end chucks, the axial jacks acting between these plates so that the thrust exerted by these jacks is transmitted in the axis and in the same way for all the fixing components gripping the frame tube.

One can make up for the absence of centering devices for the tubes by utilizing supports integral with the frame, keeping the axis of the said tube in agreement with the axis of the central chuck. These supports may consist of cradles of adjustable height, diabolos, etc., on which the tubular parts can slide without appreciable friction.

To enable the apparatus to be moved as the welding of the tube progresses, the whole apparatus can be mounted on a chassis resting on the ground via legs, caterpillars or the like or handled by cranes between two welding operations.

In cases where the apparatus is used to carry out welding of pipelines of great length, since it is not possible in practice for the tube integral with the part of the pipeline already made to be displaced along its axis, the invention provides for mounting the cuff and the butted tube in such a way that they can move axially along their support, for example by mounting the latter in the chassis by means of sliding connections. After carrying out the two welds of the tube, the apparatus can be moved along the welded tube assembly by opening the fixing jacks, or in another solution (applicable to machines for prefabricating industrial pipelines) by opening completely on either side of a plane passing through the axis of the machine (clearing very curved tubes or branches located on one side or other, bulky apparatus such as valves, flanges, tees, etc.).

According to one form of embodiment, the central chuck and its components for putting into rotation are made up of two parts articulated around an axis parallel to the axis of the chuck. This articulation can be effected, for example, by means of jointed systems actuated by jacks. So as to divide the rotation torque between the two parts of the central chuck, the driving device of the chuck can itself be doubled, this device being made of two assemblies of pinions or chains driving the chuck.

What has just been said with regard to the central chuck can also be applied to the end chucks to permit introduction of the tubular parts into the apparatus or their removal. As in the case of the central chucks these end chucks can be made up of two articulated parts one on another.

According to another characteristic of the invention, deburring of the welds inside the tubes is carried out by means of one or more tools, for example, of the milling or grinding type, mounted on a shaft supported along the axis of the tubes and cuff by means of guiding and also by a mandrel clamped on the inside of the tube that has just been welded on the cuff, this shaft being rotated by a motor. This device can be supplemented by brush and scraper discs, rotated if necessary by the shaft carrying the tools.

According to another characteristic of the invention, applicable more particularly to pipes of large section, instead of arranging the central chuck and its driving components and also the lateral chucks on the outside of the tube, these devices are arranged inside the said components.

According to this arrangement the central chuck is mounted on a shaft driven by a motor, such as a hydraulic motor, the chuck comprising gripping devices on the cuff and the stator of the motor being itself subjected to the action of jacks which bear on the tubes, the apparatus also including external jacks acting on the said tube on either side of the cuff.

Such as apparatus can be supplemented by deburring tubes mounted on the central chuck and also by a unit consisting of a metal brush and scraper discs for the chips.

Other characteristics and advantages of the invention will appear from the following description which relates to forms of embodiment given by way of non-limiting examples.

In this description, reference is made to the attached drawings in which.

Figure 1:
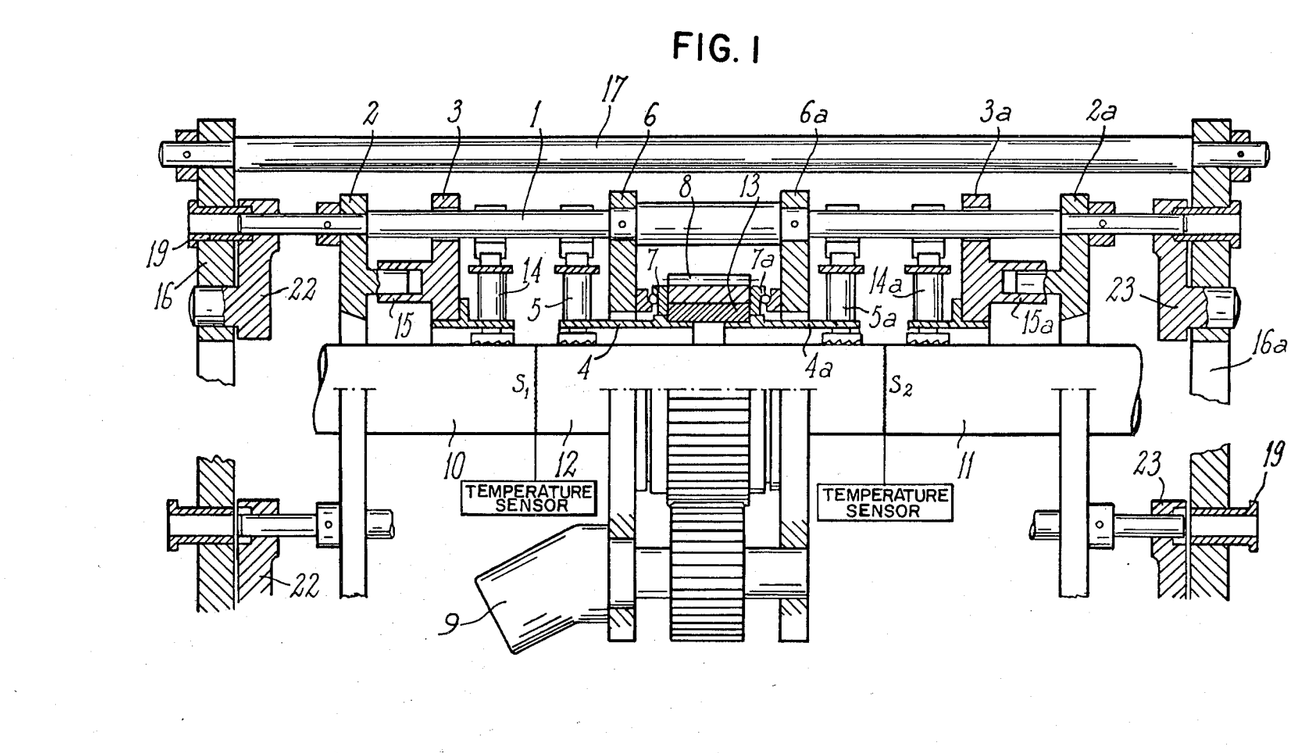
FIG. 1 is a longitudinal sectional view of the entire machine embodying features of this invention.

In the form of embodiment represented in principle in FIG. 1, the apparatus according to the invention, consists of a number of tie rods 1 which hold in fixed position the plates 2–2a, and on which the plates 3–3a can slide. Plates 2–2a and 3–3a, like 16 and 16a, are bored so as to permit the passage of tubes 10–11 that are being welded to cuff 12.

Figure 14:
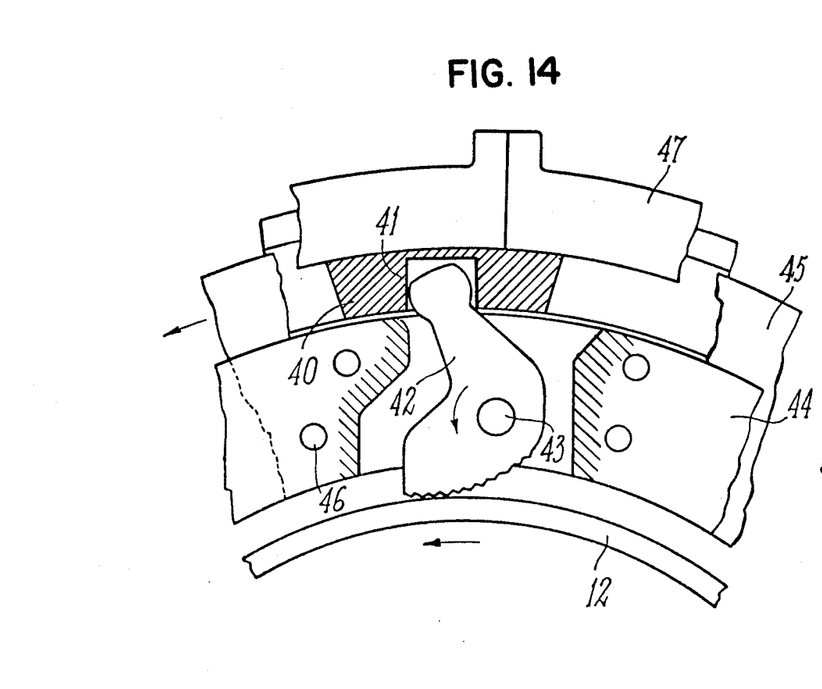
Figure 15:
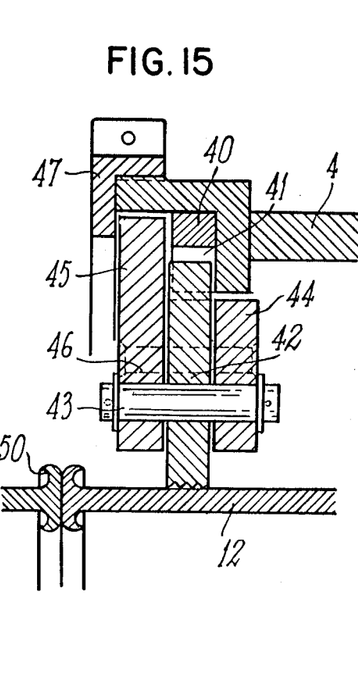

Coaxial with cuff 12 a chuck is positioned consisting of a tube made in two separable parts 4–4a driven by splines or keys. This chuck carries fixing devices 5–5a which make it solid with the cuff. These fixing devices may consist of hydraulic jacks, as represented in FIG. 1 or of any other means of tightening, such as a cam system (FIGS. 14 and 15).

On tie rods 1, plates 6–6a are also fixed, these plates forming the track for ball or roller bearings 7–7a acting as thrust bearings for the rotation of chuck 4–4a. This chuck is integral with a pinion 8 intended to give it a rotary movement from a driving motor 9. In principle an intermediate bush 13 is provided to create a range of machines variable in capacity (same frame and different chucks).

Plates 3–3a are integral with fixing devices or chucks, such as jacks 14–14a, intended for making the said plates integral with tubes 10 and 11 respectively.

Further, jacks 15 are provided between plates 2 and 3 and jacks 15a between plates 2a and 3a. The jacks 15 act in a way possibly independent from jacks 15a so as to exert independent or simultaneous thrusts as the case may be, on the one hand on the opposing surfaces of cuff 12 and tube 10 and on the other hand on the opposing surfaces of the cuff and tube 11. Jacks 15 and 15a can also be fixed on plates 6 and 6a (see FIGS. 2, 3, 4) or on the rod 1.

At the beginning of the welding process, the two groups of jacks 15 and 15a advance in an identical way one towards the other, exerting a pressure on each of the surfaces to be welded, this advance being effected in preset incremental thrusts. If one side relating to one of the welds shows (by detecting exaggerated vibrations, for example, or temperatures read by pyrometer) that it is behind-hand in relation to the other weld, the pressure is maintained on the late side, while the advance on the other side is provisionally stopped by suppressing or decreasing the corresponding thrust. When the side which was late has caught up with the other side, the order for simultaneous advance (corresponding to an equivalent extrusion on the two sides) is given to the two groups of jacks, so as to bring the two welding planes $S_1$ $S_2$ to the same softening point. A preset programmed process then carries out the successive operations in an automatic way—extrusion and forging measured by displacement pickups, the machine revealing as "bad" the welds not carried out according to the set criteria. The cuff, which was given a rotary movement around its axis, is then stopped and a simultaneous and equal forging pressure is exerted on surfaces $S_1 S_2$ by the two sets of jacks, until the weld is consolidated.

Regulation of the thrusts on the two surfaces to be welded can be carried out automatically by any appropriate means, for example by means of pyrometer telescopes reading the temperatures in line with the surfaces. These telescopes can be mounted on carriages moving with the mobile chuck so as to remain constantly in line with the relative surface.

Figure 2:
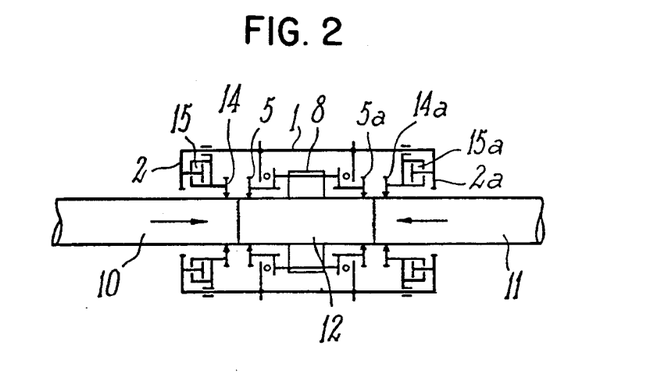
FIGS. 2–4 are diagrammatic views of the machine of FIG. 1, showing the components in various arrangements.
Figure 3:
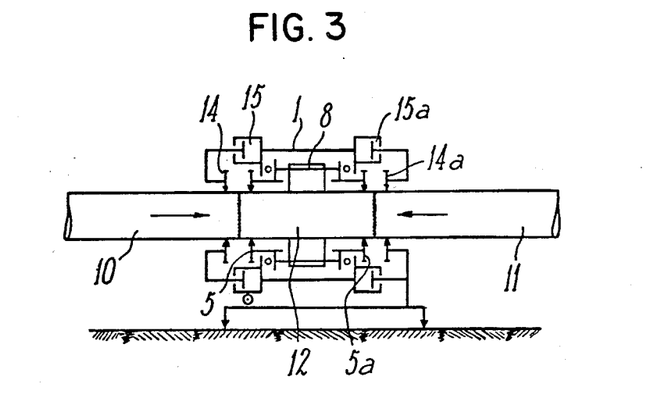
Figure 4:
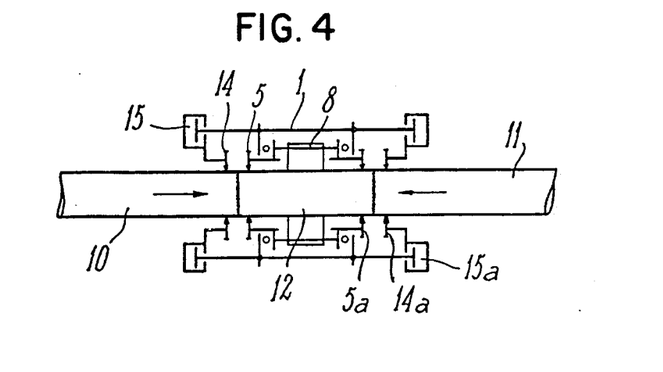

The diagrams in FIGS. 2–4 relate to machines of the type described and show how the components which form them can be arranged. In these diagrams the same reference numbers have been put as those of FIG. 1 to designate the same components.

It will be noted that the arrangement represented in FIG. 2, which is that of FIG. 1, leads to a machine of relatively longer length than in the following arrangements:

The arrangement in FIG. 3 gives a machine with length reduced to a minimum, the jacks being transferred to the central part of the machine and the plates 2 and 2a suppressed.

The machine shown in FIG. 4 is also of reduced length and gives easier access to the chucks.

Reverting to FIG. 1, it will be seen that all the components that have been described are framed by feet 16–16a forming gantries that are connected by tie rods 17. These gantries rest on the ground by means of feet 18 (FIG. 5) that can be folded back to permit working on the ground. The connections between gantries and tie rod 1 are effected by means of bushes 19, fixing the links 22 and 23 which carry the end of the said tie rod, this arrangement improving the rigidity of the opening machine during carrying out of welds.

So as to permit opening the apparatus for carrying out successive welds and passing large obstacles on the tubes, or for prefabricated piping machines as mentioned above, two half-assemblies are used, each of which is made up of half of the machine just described. Each of the half-assemblies includes a half of the chuck and its driving device.

Each of these half-assemblies (FIG. 6) is integral with a half-shell 21. The rods 22–23 are hinged on one end on the half-shell and on the other end on crossbars 24 (actually integral with the gantries). The half-shells are opened and closed by means of jacks 25 acting on the rods 22 and 23. Centering pins 26 enable the two half-shells to be adjusted exactly with one another, and blocking cams keep the apparatus closed during the working period.

Figure 6:
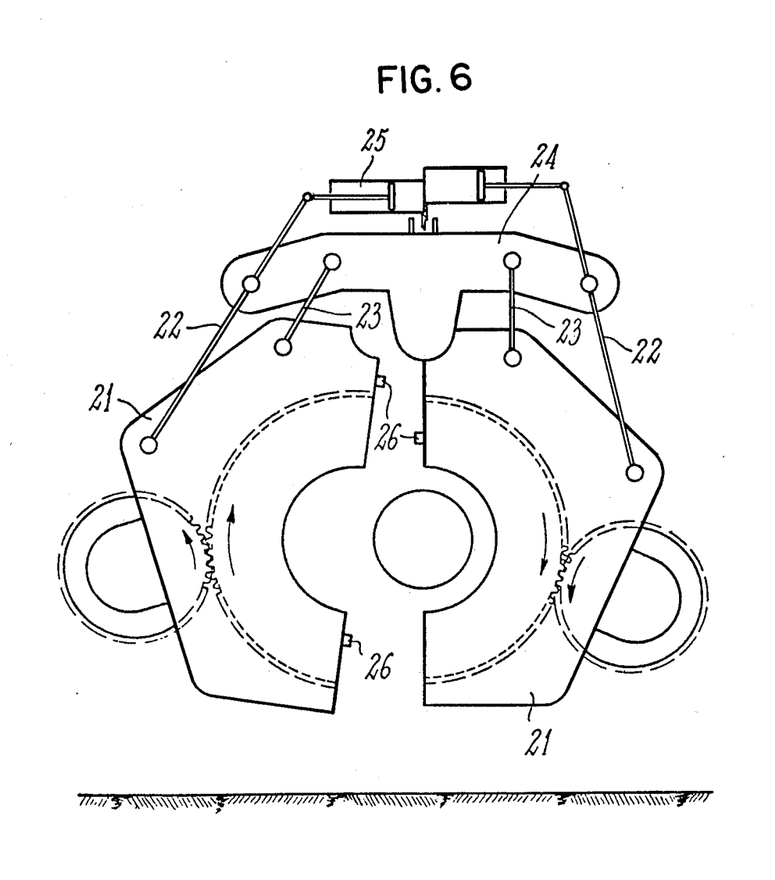
FIGS. 6 and 7 are end views of the half-shells.
Figure 7:
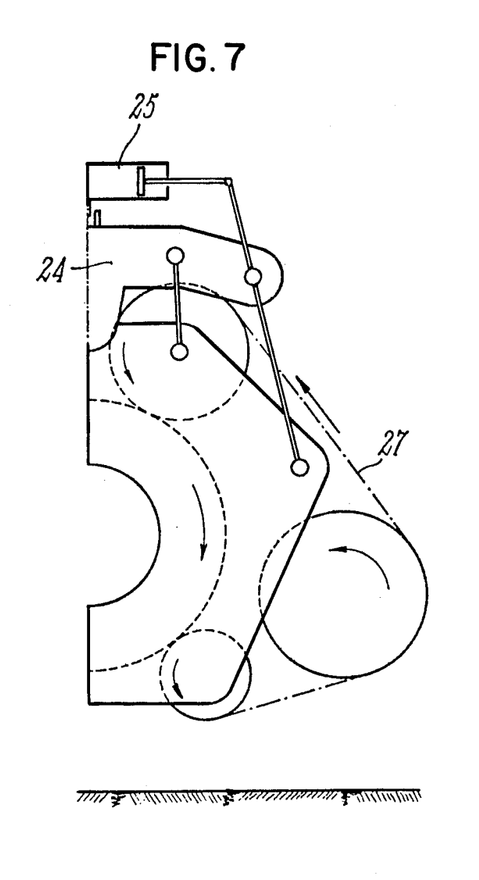

FIG. 6 shows on the right a half-shell in closed position and on the left a half-shell in open position. FIG. 6 also shows a drive by hydraulic or electric motor and FIG. 7 relates to a drive by belt 27.

In the arrangements with total opening of the machine, it is necessary in particular to separate the bearings into two parts. For this purpose a ball circulation arrangement 28 (FIG. 8) can be used with two separate ball tracks.

Figures 5, 8, 9:
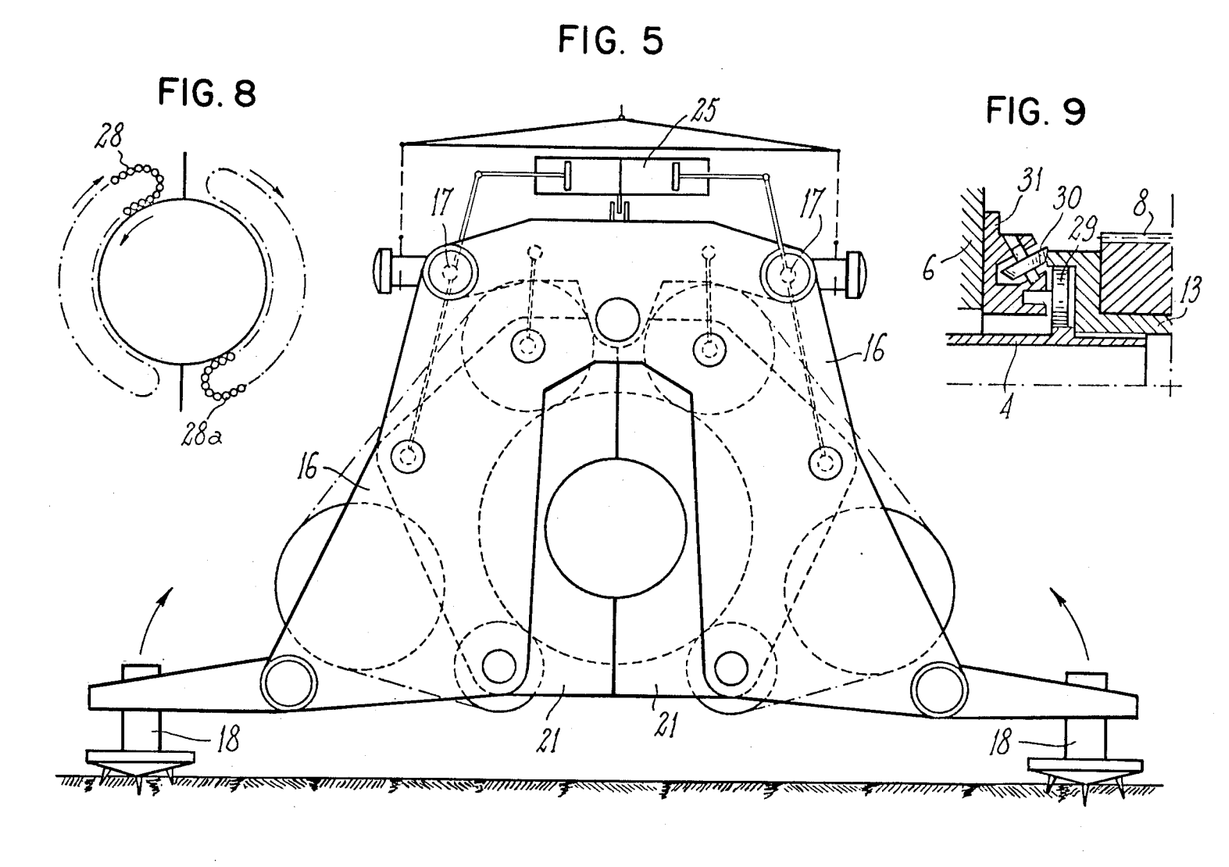
FIG. 5 is an end elevational view of an opening machine with support resting on the ground during working periods.
FIG. 8 is a bearing arrangement with circulation of balls for the opening machine.
FIG. 9 is a sectional view of a variant with rollers.

It is also possible to use an arrangement as per FIG. 9 in which the ball bearings are replaced by two half-assemblies formed by rollers 29 rolling on cylinders 4 or 13 and conical thrust rollers 30 turning in parts 31 integral with plates 6 and 6a.

Figure 10:
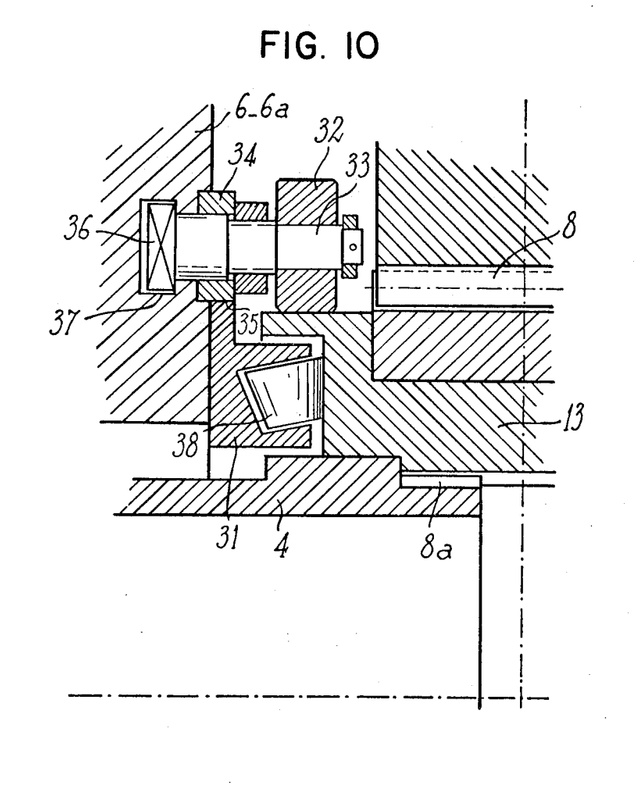
FIGS. 10 to 12 are devices for complete disengagement of the central chuck.
Figure 11:
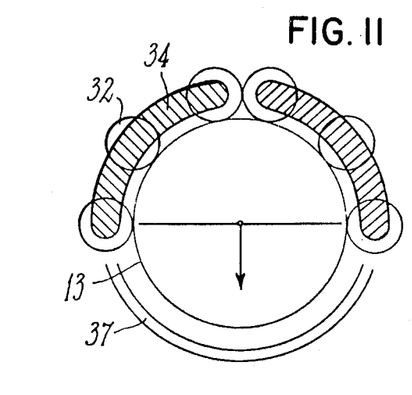
Figure 12:
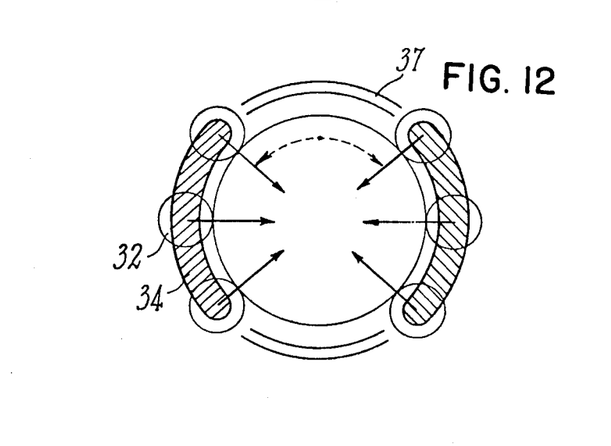

FIGS. 10–12 show another arrangement permitting complete disengagement of the central chuck with regard to the carrying machine. In this arrangement rollers 32 are used, the spindles 33 of which are carried by supports 34 in the form of arcs of a circle able to turn in grooves 35 milled in plates 6. The spindles 33 are held by heads 36 moving in circular Tee-grooves 37. Further, taper rollers 38 are inserted between the chucks and the parts 31 integral with plate 6.

FIG. 11 shows the device thus described in its open position, i.e., disengaging position of chuck, and FIG. 12 shows the same device in working position.

FIG. 10, which is a view on a larger scale than FIG. 1, shows the connection between the two half-chucks 4 and their rotation control, the drive being effected by pinions 8 and grooves 8a. It will also be seen from this figure how the axial thrusts of jack 15 are transmitted in an individual way on to the chuck by taper rollers 38.

Figures 13, 16, 17, 18, 19:
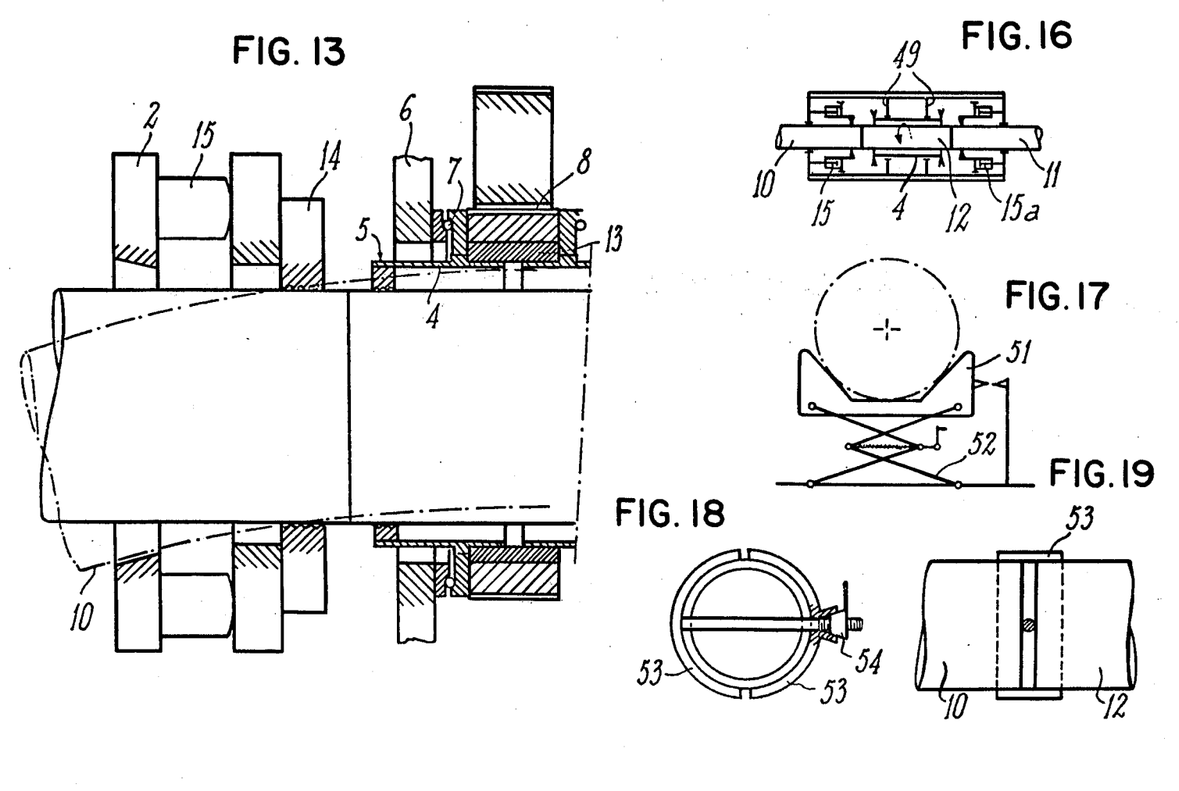
FIG. 13 is a diagrammatic view regarding passing a monoblock closed machine on bent tubes.
FIGS. 14–16 are sectional views relating to self-centering devices and friction drives.
FIG. 17 is a cradle system for centering hydraulic chucks that are not self-centering.
FIGS. 18 and 19 are a rapid alignment device, for provisional connection of tubes to cuff.

As is shown in FIG. 13, a simple, non-opening apparatus according to the invention can permit the passage of bent parts of tubes if the radius of curvature is sufficiently large. This is in fact the case of pipelines the parts of which are approximately in line (a radius of curvature equal to or greater than twenty times the diameter) and even the bent tubes have straight parts at their end which enable them to be joined up by means of the apparatus described. For passing these bends, the fixing devices 14 and 5 (such as jacks or mechanical jaws) are removed. This result is possible owing to the fact that the chucks have a much larger diameter than that of the tubes to be welded.

In the above, devices of the jack type have been mentioned for fixing the chuck on the cuff. It is of course also possible to use other types of clamp and in particular self-centering clamping devices.

FIGS. 14 and 15 relate to using a self-centering gripping device mounted on chuck 4. This device can be completely dismantled if necessary.

This device comprises a certain number of parts 40 fixed at each end of the chuck and having recesses 41, in each of which is engaged the head of a cam 42 turning on a spindle 43. Spindles 43 are mounted in rings 44–45 in two parts, kept separated from one another by tie bars 46. The whole is held in place by a dished ring 47 that can be separated into two parts along a diametral plane like rings 44–45.

This device wedges on cuff 12 in the suitable direction under the effect of the motive torque, and the tightening obtained in self-centering. When the cams 42 are unclamped, they rise by a height $h$ that enables the tube to pass through (and also the external bead 50 formed by the weld, if any).

The self-centering devices just described are designated by the overall reference No. 49 in FIG. 16.

It is of course possible to use self-centering devices for gripping the tubes 10 and 11, and these devices can be of the type described above.

In cases where centering devices are not used, it is possible to use means of alignment as already mentioned, for example, like that represented diagrammatically in FIG. 17 which is made up of cradles 51 on which the tubes rest, these cradles being mounted on frame 1 by a pantograph 52, with positioning marks for regulating the height of axis.

FIGS. 18 and 19 show a type of provisional connection that can be quickly dismantled for joining one of the tubes, such as 10, to the cuff 12. This connecting device is for example made up of two half-rings 53 gripping the tube by bolt and quick-fastening nut 54. It enables the tube and cuff assembly to be introduced easily into the machine, the cuff 12 coming to button the end of the tube which has already been put into position.

According to another form of embodiment in regard to rotating the cuff, it is possible to use a chuck arranged so as to center the cuff on the one hand and rotate it on the other. This chuck can be of known type containing eccentric jaws pivoting on a ring, the spindles of the jaws carrying pinions connected to one another by a tooth ring which is actuated by means of a key via a rack in order to bring the jaws into contact with the cuff, tightening then taking place automatically under the effect of the rotation of the chuck.

The ends of chucks 5 and 5a on the rotating part are fitted with turning tools used for eliminating the beads on the side where the tools are. For this purpose chucks 14 and 14a are unclamped; the central cuff, put into rotation, is free to move laterally with regard to the welded tubes under the pressure of jacks 15 and 15a so as to carry out the necessary traversing operation.

This is equally valid for arranging the rotary drive of the central cuff from the inside or the outside.

Figure 20:
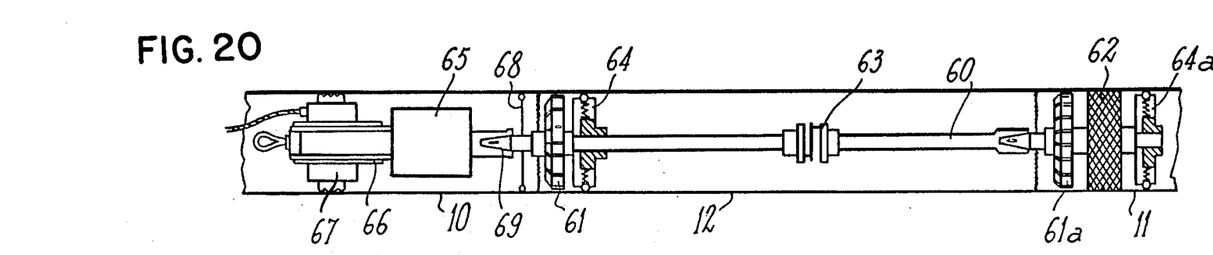
FIG. 20 is a top plan view of a device for deburring the weld inside the tube and cuff.

FIG. 20 shows a typical device introduced inside tubes welded to a cuff to remove the internal beads of the welds.

This assembly comprises a shaft 60 on which are mounted circular milling cutters 61-61a or suitable tool holders and also a metal brush 62 in the form of a disc. This shaft, which can be made in two parts connected by a flexible coupling 63, is held centered on the axis of tubes 10-11 and cuff 12 by guides 64-64a which can be made up of circular plates carrying on their periphery spring-mounted balls. A circular screen 68 can be provided upstream of the milling cutter 61.

Shaft 60 is driven by a motor 65, the stator of which is coupled to a plug 66 sliding in a hydraulic mandrel 67 tightening on the inside of tube 10. This mandrel enables shaft 60 and consequently the tools to be kept centered during the work. The milling equipment is mounted on a floating mandrel 69.

Figure 21:
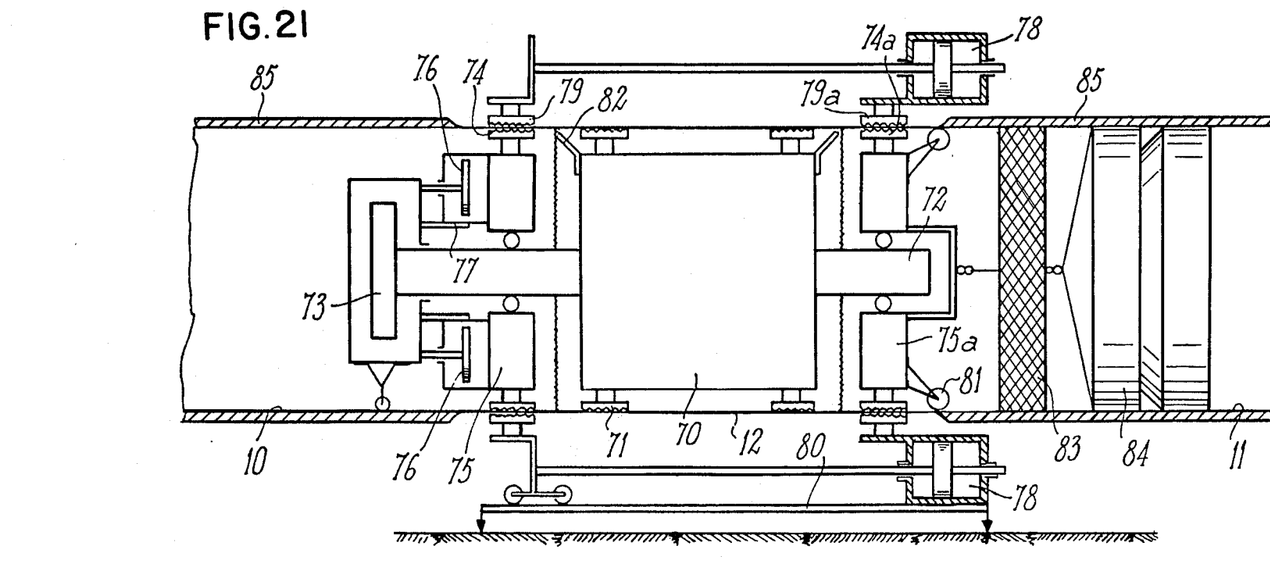
FIG. 21 is a diagrammatic longitudinal view of another form of embodiment of the machine.

The form of embodiment represented diagrammatically in FIG. 21 relates to an arrangement according to which the central mandrel and its actuating components are arranged inside the cuff and tubes.

In this figure the central mandrel will be seen at 70, comprising tightening devices 71 bearing on the cuff 12, the shaft 72 on which the mandrel is mounted being driven by a hydraulic motor 73. This figure also shows, at 74-74a, the tightening devices of mandrels 75-75a, these mandrels being mounted so as to be able to move longitudinally on shaft 72. Between mandrel 75 and the stator of hydraulic motor 73, thrust regulation jacks 76 are provided. Possibly supports 77 are provided, fitted with grooves engaging in corresponding grooves of the jack cylinders. On the outside of the tubes and rotating cuff, jacks 78 are provided for general pressing and forging, according to the arrangement described in the main patent. These jacks act on grips 79-79a arranged in line with the inside grip 74-74a.

As shown in the figure, jacks 78 and their grips can be mounted on a supporting chassis 80, either fixed or mounted so as to be mobile, for example, on wheels or caterpillars or on feet.

In the form of embodiment shown, the assembly of central mandrel, end mandrels, driving motor and thrust regulation jacks is mounted on rollers 81 rolling on the inside of the tube. One could of course use any other arrangement, for example a sledge with sliding skids or a self-propelling device.

The arrangement shown in FIG. 21 also includes deburring tools 82 mounted on mandrel 70, as well as a metal brush 83 and scraper discs 84.

According to a variant of the device described above, instead of the external grips 79-79a bearing on the metal of the tubes, they can be moved so that they exert their action on the coating 85 of the tubular parts (in the case of pipes coated with concrete). It is then an advantage to carry out the tightening via flexible means, e.g., inflatable tires, so as to avoid any local damage or marking on the coating.

I claim:

1. Apparatus for assembling by friction-welding tubular components made of metal or thermoplastic material, comprising separate support means for retaining each of the tubular components in endwise alignment with the adjacent ends spaced one from the other;

means operatively associated with the support means and forming a part of said support means for releasably gripping the tubular components to prevent rotational movement about their axes;

a frame;

means operatively associated with the frame mounting each of said support means on the frame for independent movement of one support means relative to the other in the axial direction;

means operatively associated with the frame for supporting a short tubular cuff in axial alignment between adjacent ends of the tubular components;

means operatively associated with the means for supporting the cuff for rotating the short tubular cuff between the ends of the tubular components;

separate drive means mounted on the frame and operatively engaging each of said support means for independent axial movement of each of said support means in the direction to thrust the adjacent ends of the tubular components into pressure contact with the adjacent ends of the cuff to effect softening by heat generation in response to such frictional engagement during rotational movement and to effect consolidation by welding upon cooling after movement of the cuff has been stopped;

means associated with said cuff supporting means for sensing the temperature at the frictionally engaged ends of the tubular members in engagement with the rotating cuff, said separate drive means being responsive to said temperature sensing means to suppress or decrease the thrust on the support means for the tubular component having the higher temperature for equalization of the temperature conditions existing at the respective ends.

2. Apparatus as claimed in claim 1 in which the drive means for actuating said support means for independent axial movement comprises a pair of jacks mounted on the frame with one member of the pair engaging the support means for one of the tubular components while the other member of the pair engages the support means for the other of the tubular components independently to actuate the tubular components for movement in the axial direction.

3. Apparatus as claimed in claim 1 in which the means for rotating the short tubular cuff comprises a central chuck including a tube formed in two separate parts, means mounted between the two parts for rotating the chuck, and an operative connection between the chuck and cuff for imparting rotational movement to the cuff in response to rotational movement of the chuck.

4. Apparatus as claimed in claim 3 in which the assembly consisting of the central chuck and the components for putting the chuck into rotational movement are formed of two parts articulated around an axis parallel to the axis of the chuck.

5. Apparatus as claimed in claim 1 which includes end chucks gripping the ends of the tubular components and mounted for sliding movement along the axis of the cuff, said end chucks being formed of two parts articulated around an axis parallel to the axis of said chuck.

* * * * *